United States Patent
Shin et al.

(10) Patent No.: US 9,569,795 B1
(45) Date of Patent: Feb. 14, 2017

(54) COMPUTER-IMPLEMENTED METHOD OF CAPTURING TRANSACTION DATA ASSOCIATED WITH AN ONLINE PURCHASE

(71) Applicant: Perfect Price, Inc., San Francisco, CA (US)

(72) Inventors: Youngin Shin, Palo Alto, CA (US); Alexander C. Shartsis, Piedmont, CA (US)

(73) Assignee: Perfect Price, Inc., San Francisco, CA (US)

( * ) Notice: Subject to any disclaimer, the term of this patent is extended or adjusted under 35 U.S.C. 154(b) by 0 days.

(21) Appl. No.: 15/053,241

(22) Filed: Feb. 25, 2016

(51) Int. Cl.
  *G06Q 30/06* (2012.01)
  *H04L 29/08* (2006.01)
  *G06F 9/54* (2006.01)
  *G06F 11/34* (2006.01)

(52) U.S. Cl.
  CPC .......... *G06Q 30/0635* (2013.01); *G06F 9/542* (2013.01); *G06F 11/3438* (2013.01); *G06F 11/3476* (2013.01); *G06Q 30/06* (2013.01); *H04L 67/025* (2013.01); *H04L 67/146* (2013.01); *H04L 67/22* (2013.01)

(58) Field of Classification Search
  CPC ... G06Q 30/06; G06Q 30/0635; H04L 67/025; H04L 67/22; H04L 67/146; G06F 9/542; G06F 11/3438; G06F 11/3476
  USPC ....................................................... 705/26.1
  See application file for complete search history.

(56) References Cited

U.S. PATENT DOCUMENTS

| | | | | | |
|---|---|---|---|---|---|
| 6,944,660 | B2 * | 9/2005 | Eshghi | ................ | H04L 12/2602 709/224 |
| 7,062,475 | B1 * | 6/2006 | Szabo | ............... | G06F 17/30867 706/11 |
| 2008/0072239 | A1 * | 3/2008 | Liang | .................. | G06F 11/3476 719/311 |
| 2010/0070872 | A1 * | 3/2010 | Trujillo | ............... | G06F 3/04892 715/745 |
| 2013/0125143 | A1 * | 5/2013 | Kikuchi | ............... | G06F 11/3438 719/318 |
| 2013/0185643 | A1 * | 7/2013 | Greifeneder | ............ | H04L 67/22 715/736 |

* cited by examiner

*Primary Examiner* — Yogesh C Garg
(74) *Attorney, Agent, or Firm* — Sunstein Kann Murphy & Timbers LLP

(57) ABSTRACT

A computer-implemented method of captures transaction data associated with a purchase made on a client computer running a web browser client process and coupled over the Internet to an e-commerce server system. In this embodiment, the browser client process includes a script-generated process based on an e-commerce script served to the browser client process. The e-commerce script includes a user-enterable execute command that causes sending of a consummate-purchase command to the e-commerce server system. The method of this embodiment includes serving to the browser client process a capture script, the capture script configured to cause creation of an event log and, on entry of the execute command, to cause sending of the event log to an event server system.

6 Claims, 6 Drawing Sheets

COMPUTER-IMPLEMENTED METHOD OF CAPTURING TRANSACTION DATA ASSOCIATED WITH AN ONLINE PURCHASE

TECHNICAL FIELD

The present invention relates methods of data capture in an e-commerce environment, and more particularly to a computer-implemented method of capturing transaction data associated with an online purchase.

BACKGROUND ART

Summary of the Embodiments

In accordance with one embodiment of the invention, there is provided a computer-implemented method of capturing transaction data associated with a purchase made on a client computer running a web browser client process and coupled over the Internet to an e-commerce server system. In this embodiment, the browser client process includes a script-generated process based on an e-commerce script served to the browser client process. The e-commerce script includes a user-enterable execute command that causes sending of a consummate-purchase command to the e-commerce server system. The method of this embodiment includes serving to the browser client process a capture script, the capture script configured to cause creation of an event log and, on entry of the execute command, to cause sending of the event log to an event server system. Optionally, serving the capture script comprises serving to the browser client process the e-commerce script, wherein the e-commerce script has been previously modified to cause creation of an event log and, on entry of the execute command, to cause sending of the event log to an event server system.

In a related embodiment, the method further includes serving by the e-commerce server system to the browser client process a starter script, which, on being downloaded by the browser client process, executes and causes the web browser client process to download and execute the modified e-commerce script. Optionally, the starter script cause the web browser client process to download the modified e-commerce strip from a JavaScript server system that is distinct from the e-commerce server system and from the event server system. Alternatively or in addition, the capture script checks for whether a cookie has been previously stored in local data storage associated with the web browser client process, wherein if not, then the modified e-commerce script generates a unique identifier for the browser client process, stores the unique identifier as a cookie in the local storage, and uses the unique identifier to tag the event log, or, if so, the modified e-commerce script reads the unique identifier in the stored cookie and uses the unique identifier to tag the event log. In each case the unique identifier being stored by the event server system in association with the event log. Alternatively, or in addition, the capture script attaches action listeners to monitor potential actions that may be performed via the browser client process in connection with a web page served by the e-commerce server system, each such action listener configured to write its corresponding action to the event log when such action has occurred.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

Figure 1:
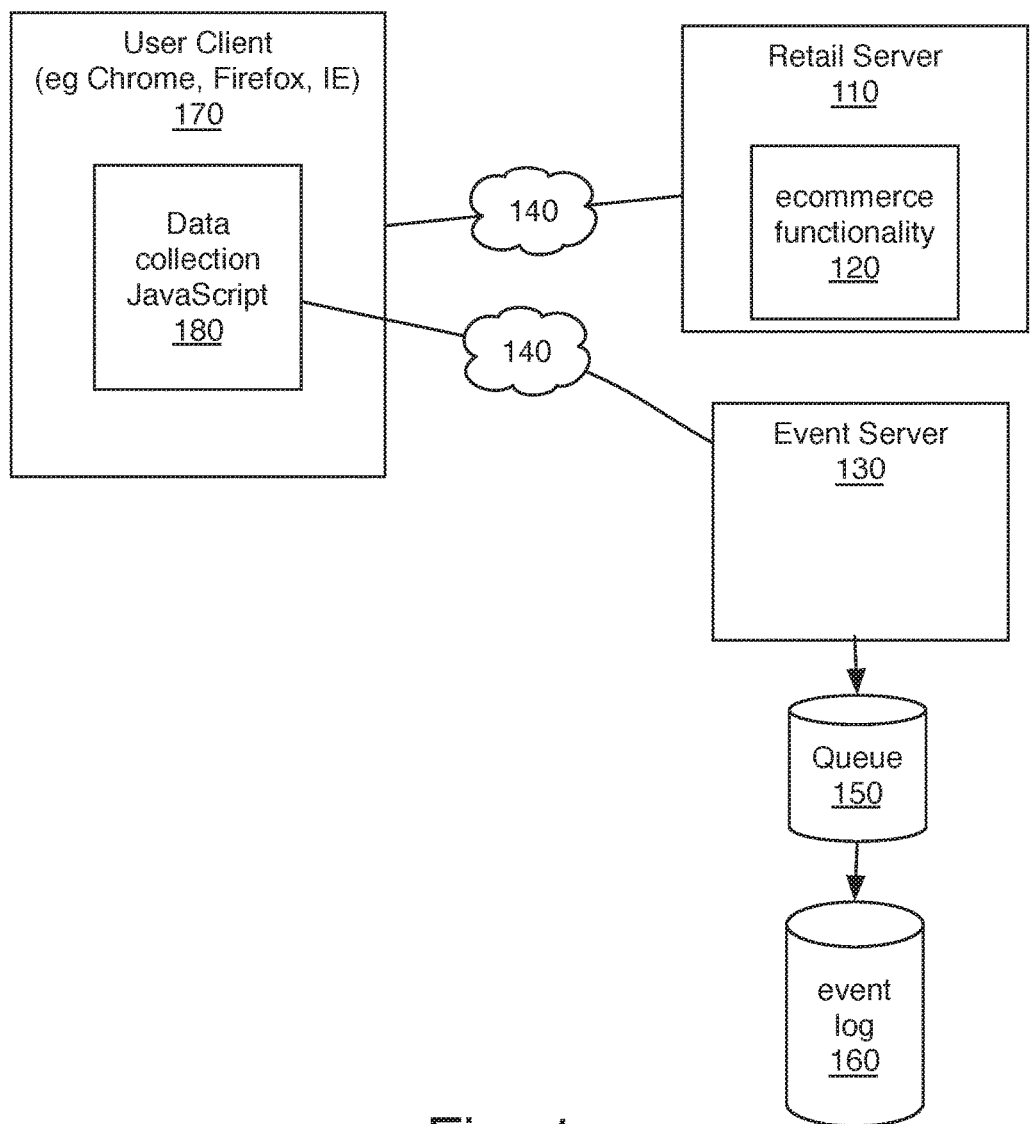
FIG. 1 is a diagram of system architecture of an embodiment of the present invention when the web browser is in a normal operating state.

FIG. 1 is a diagram of system architecture of an embodiment of the present invention when the web browser client process 170 is in a normal operating state. The client web browser process 170, which may be implemented by a program such as the Internet Explorer (available from Microsoft Corporation, Redmond, Wash.), Chrome (available from Google, Inc., Mountain View, Calif.), or Firefox (available from Mozilla Corporation, Mountain View, Calif.), is executing on a computing device of a user who is using the web browser client process 170 in an e-commerce transaction with retail server system 110 (sometimes herein called e-commerce server system) over the Internet 140. The retail server system 110 includes e-commerce functionality 120, by which it communicates with the web browser client process 170 to enable consummation of an e-commerce transaction. In e-commerce transactions, it is common for the e-commerce server system to serve a JavaScript with a web page, and the JavaScript facilitates entering into the e-commerce transaction by the user by making the web page interactive so as to support functionality such as animation of elements of the page, loading of new page content without reloading of the entire page, and submitting data to the server. In this particular case, the web browser client process 170 includes JavaScript 180 that provides a logging function, in addition to the normal e-commerce functionality, so that the user's behavior in consummating the purchase can be logged. Operation of this JavaScript 180 is described in further detail below. The JavaScript 180 causes an event log to be transmitted over the Internet 140 to event server system 130, where it is placed in FIFO queue 150 and stored in event log storage 160.

Figure 2:
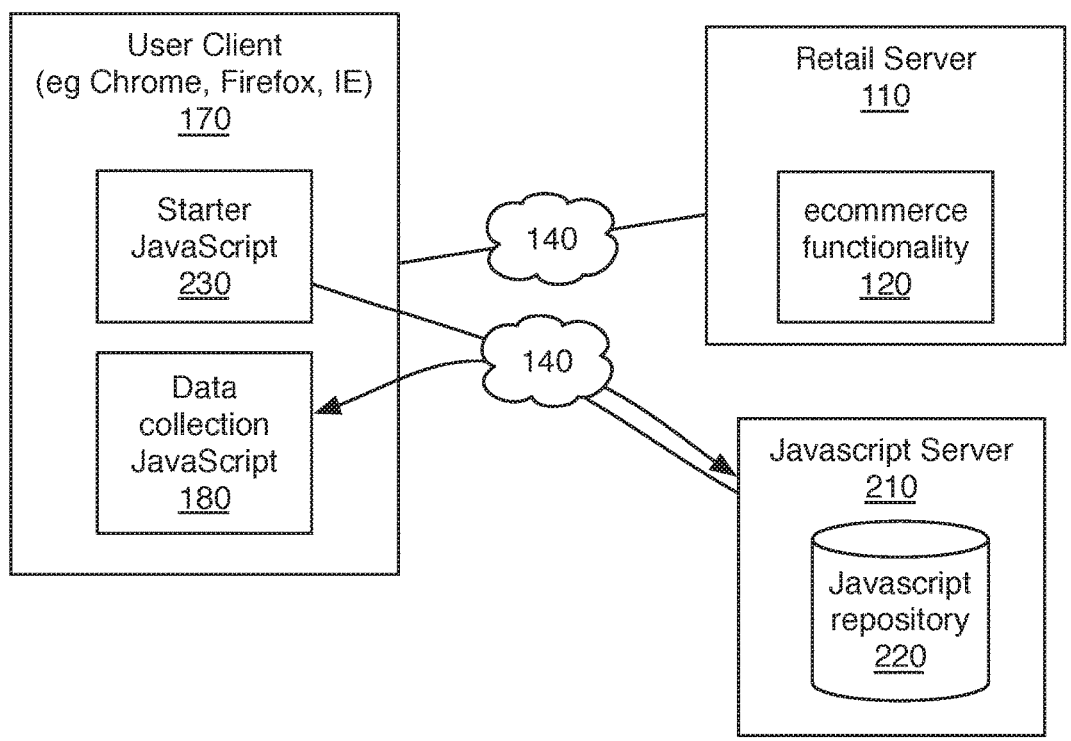
FIG. 2 is a diagram of system architecture of an embodiment of the present invention when the web browser is in a setup state on initial load of a web page from an e-commerce server system.

FIG. 2 is a diagram of system architecture of an embodiment of the present invention when the web browser client process is in a setup state on initial load of a web page from an e-commerce server system. The web browser client process 170 includes initially the starter script, which is Starter JavaScript 230, which is downloaded with a web page, over the Internet 140 from the retail server system 110, which, as in FIG. 2, is equipped with e-commerce functionality 120. On being downloaded by the web browser client process 170, the starter JavaScript 230 communicates over the internet 140 with the JavaScript server system 220, which includes JavaScript repository 220. The JavaScript server system 220 selects a particular data collection JavaScript appropriate for use by the retail server system 110, and that JavaScript is downloaded by the web browser client process 170, and, on downloading, is executed so as to establish the architecture described previously in connection with FIG. 2.

Figure 3:
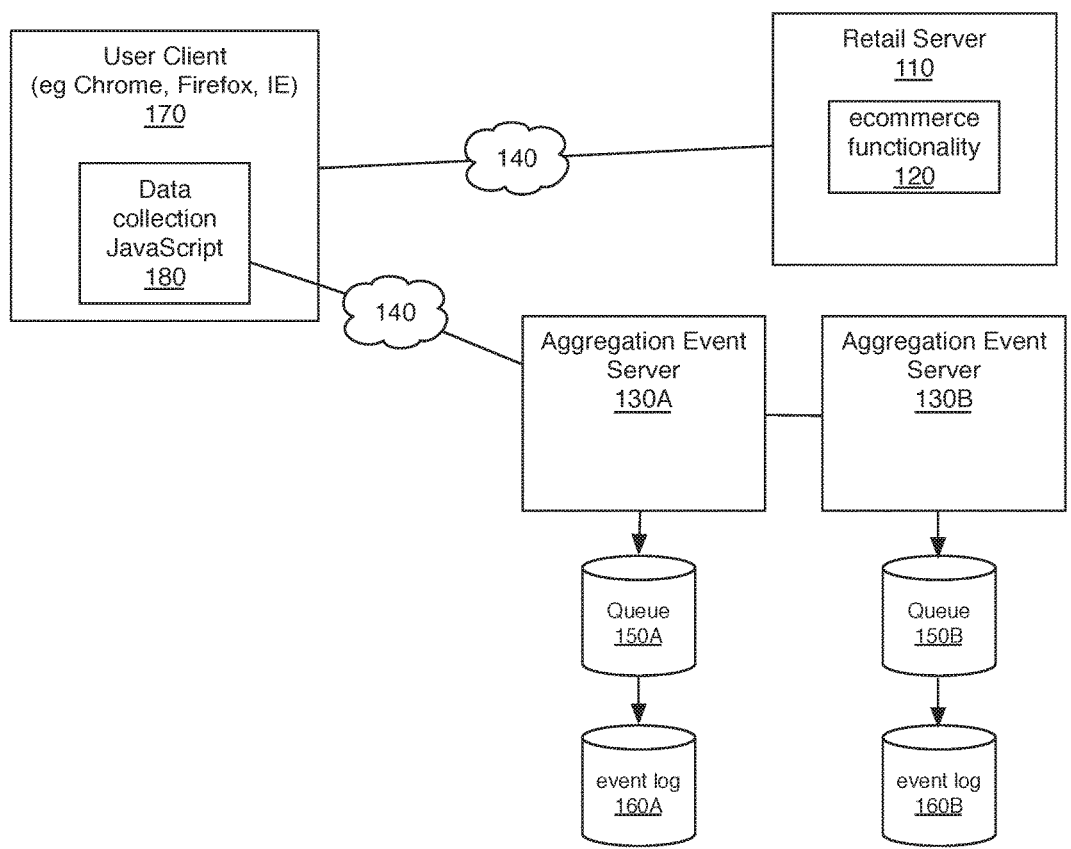
FIG. 3 is a diagram, similar to that of FIG. 1 but providing further detail, of system architecture of an embodiment of the present invention when the web browser is in a normal operating state.

FIG. 3 is a diagram, similar to that of FIG. 1, but providing further detail of system architecture of an embodiment of the present invention when the web browser client process is in a normal operating state. In this figure, the event server system is implemented by a pair of servers 130A and 130B that are configured to handle the server load.

Figure 4:
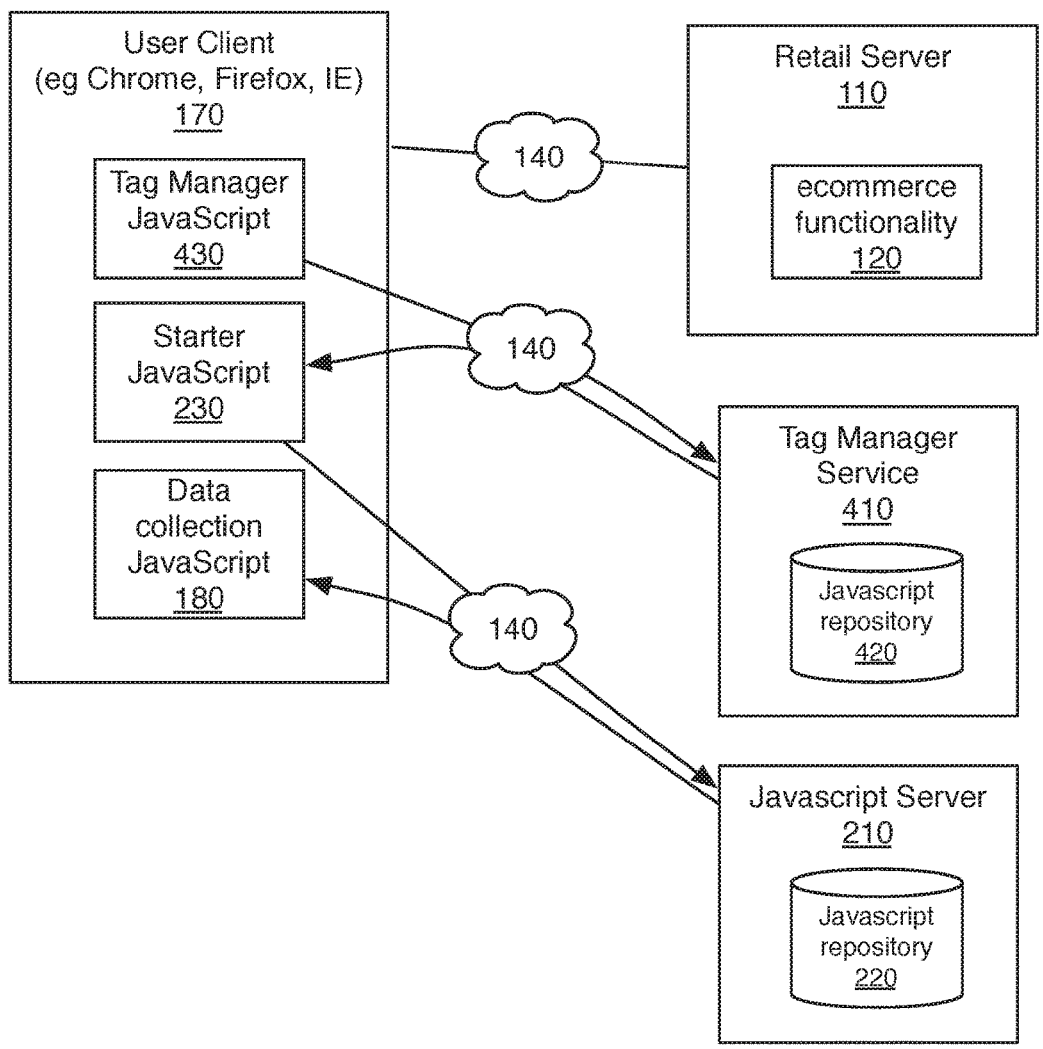
FIG. 4 is a diagram, similar to that of FIG. 2 but providing further detail, of system architecture of an embodiment of the present invention when the web browser is in a setup state on initial load of a web page from an e-commerce server system.

FIG. 4 is a diagram, similar to that of FIG. 2, but involving use of a tag manager and providing further detail, of system architecture for an embodiment of the present invention wherein the web browser client process 170 is in a setup state on initial load of a web page from an e-commerce server system. In this figure, the starter JavaScript 230 is downloaded over the Internet 140 from tag manager service 410 which includes JavaScript repository 420, from which the starter JavaScript 230 is selected. In this embodiment, a tag manager is used in lieu of the starter JavaScript described in connection with FIG. 2. Tag managers as offered in the market by Google, Inc. of Mountain View, Calif. (as Google Tag Manager) and Tealium of San Diego, Calif. (as Tealium) to facilitate marketing or business user additions of a service without software developer work required to produce computer code that would be operative on a web server system. The tag manager JavaScript 430, associated with the web browser client process 170, is downloaded from the retail server system 110 with a web page, and executes on being downloaded. Furthermore, a tag manager process may be programmed to collect data on behalf of the e-commerce service to pass at the same time the same data to many additional services. As an alternative to the use of the starter JavaScript, the tag manager JavaScript 430 can be programmed to send data from the e-commerce web page directly to the data collection JavaScript 180, or directly to the event server system 130 of FIG. 1.

Figure 5:
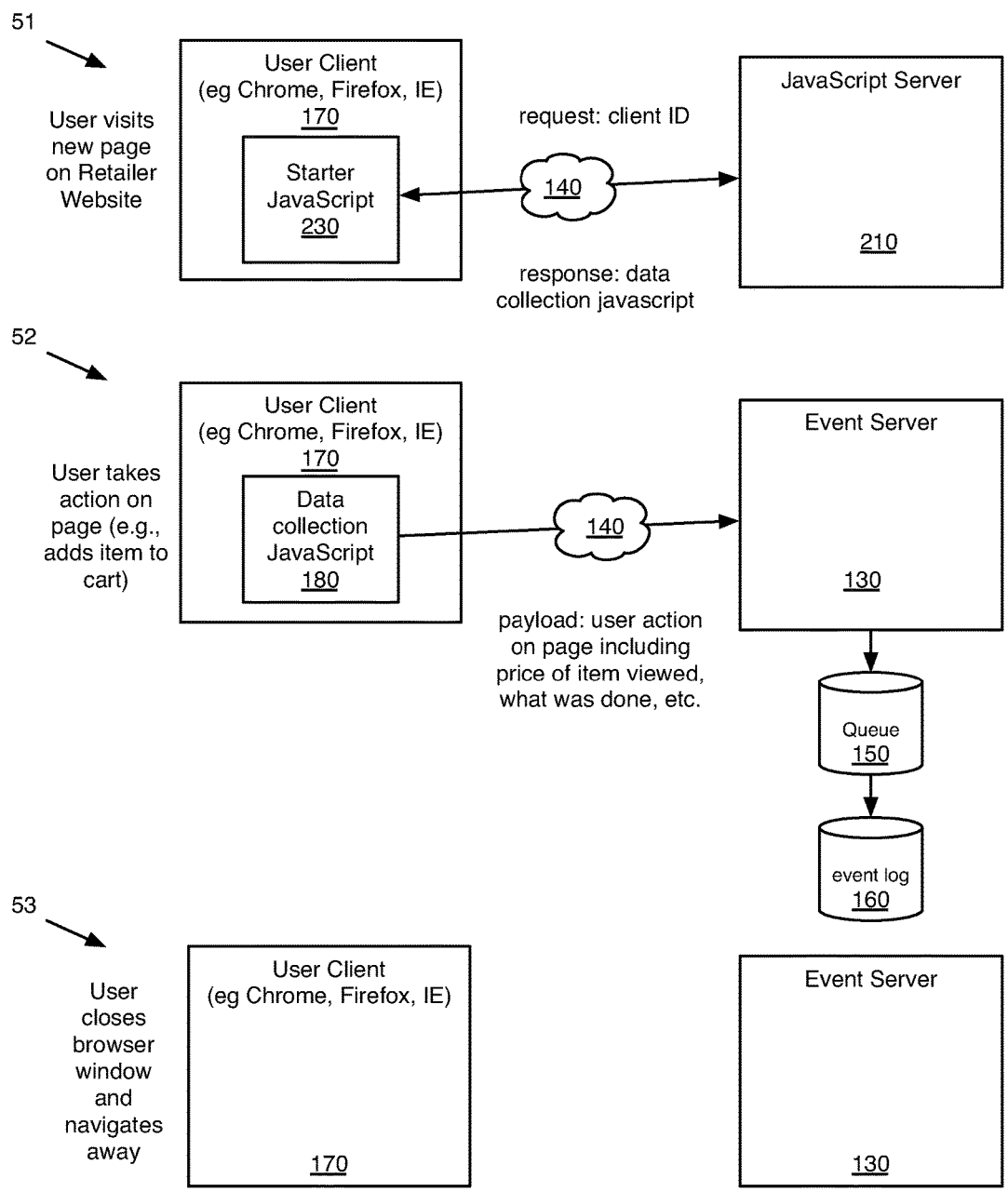
FIG. 5 is a series of diagrams showing successive states of the system of FIG. 4 in the course of an e-commerce transaction in accordance with an embodiment of the present invention.

FIG. 5 is a series of diagrams showing successive states of the system of FIG. 4 in the course of an e-commerce transaction in accordance with an embodiment of the present invention. In the scenario of row 51, the user visits, via the web browser client process 170, a new web page served by server system 210, and the starter JavaScript 230 is downloaded over the Internet 140 along with the webpage from e-commerce server 210. In the scenario of row 52, the user takes action on the web, such as adding an item to a shopping cart. In this case the data collection JavaScript 180 sends an event log over the Internet 140 to event server system 130, where the event log is placed in queue 150 for storage in event log storage 160. Finally, in the scenario of row 53, the user closes the window that was displaying the e-commerce web page downloaded from the e-commerce server 210, and navigates away from the web page. Since the e-commerce activity has been concluded, the communication over the Internet 140 with the event server system 130 is terminated.

Figure 6:
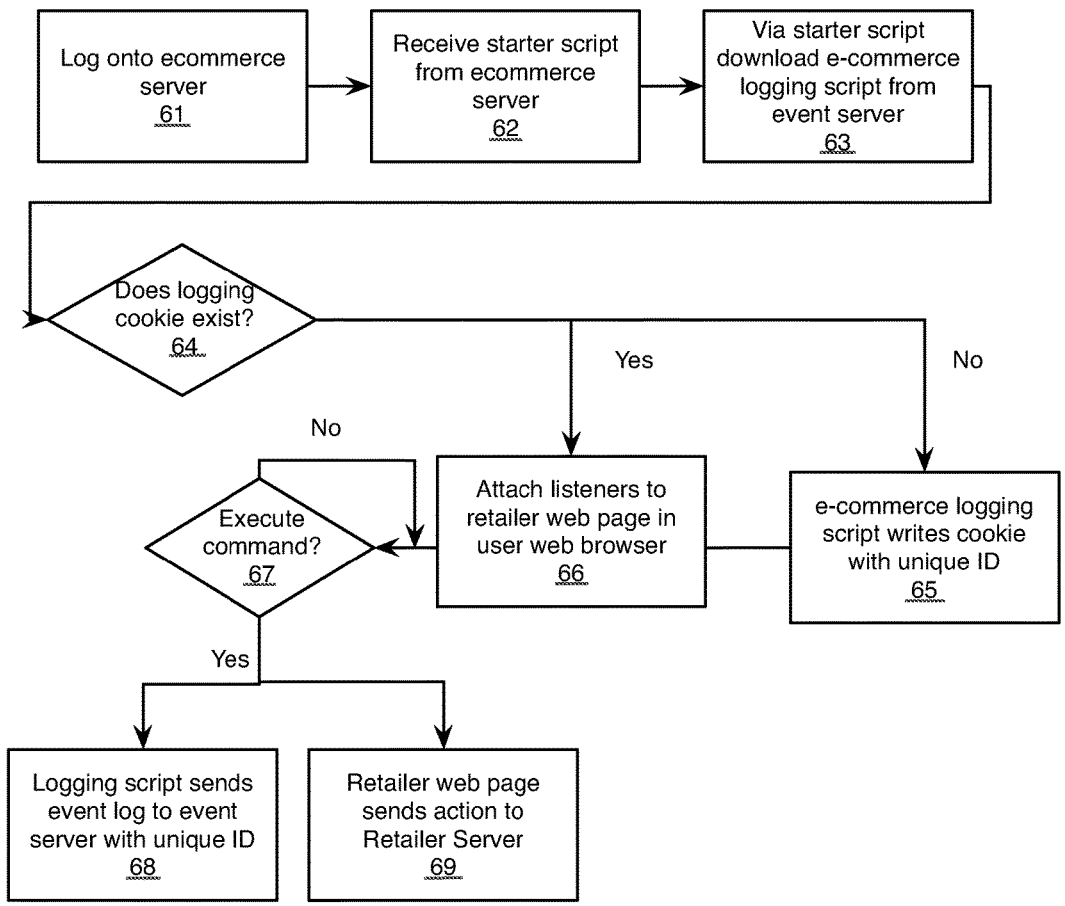
FIG. 6 is a logical flow diagram showing logical processes carried out by the web browser client process in the course of an e-commerce transaction in accordance with an embodiment of the present invention.

FIG. 6 is a logical flow diagram showing logical processes carried out by the web browser client process in the course of an e-commerce transaction in accordance with an embodiment of the present invention. In process 61, the web browser client process is used by the user to log onto the e-commerce web site and thus to initiate communication with the e-commerce server system. In the course of such communication, in process 62, there is downloaded by the web browser client a starter script from the e-commerce server system. In process 63, after the starter script has been downloaded from the e-commerce server system, the starter script executes and causes the web browser client process to download and execute the special e-commerce script from the JavaScript server system. This special e-commerce script has been modified from a conventional e-commerce script so as to implement the processes described in connection with this FIG. 6. In process 64, the special e-commerce script checks for whether a cookie has previously been stored (by a previously downloaded special e-commerce script) in local storage associated with the web browser client process. If not, then, in process 65, the special e-commerce script generates a unique identifier for that specific web browser client, and writes it to the web browser client process's local data store as a cookie, along with certain other relevant data, including caching data that will be sent to the event server system (item 130 of FIG. 1) once a connection is reestablished should it not be reachable, as well as additional data, such as session data on how long the user of the web browser has looked at the web page, how many pages the user has visited in the session, identification of the web-browser and device on which the web browser is active, demographic information about the user based on metadata such as their IP address location, etc. If the cookie already exists, the special e-commerce script reads the unique identifier, so that it may include this identifier in any communications with the event server system. In process 66, the special e-commerce script attaches action listeners to monitor potential actions that may be performed on the page, and starts an event log using the unique ID. As an example of operation of an action listener, if invoking a button on the page adds an item to a shopping cart (implemented by the e-commerce server system) or results in a purchase, the action is written to the event log by the listener attached to that action by the special e-commerce script. The ecommerce script may attach an action listener to each of several potential actions, or every potential action, depending on the specifics of the implementation. In process 67, the e-commerce script listens for whether the user has entered an execute command. If not, then control loops back repeatedly until the execute command has been determined to have been entered by the user. In process 68, after the execute command has been entered, the e-commerce script causes the event log (which has been maintained by the e-commerce script) to be sent to the event server system. In process 69, the e-commerce script associated with the web page also causes sending of the execute command to the e-commerce server system. In this manner, the e-commerce transaction is not jeopardized by inadvertent failure of the event server system to acknowledge receipt of the event log, because the logging process operates asynchronously with respect to the e-commerce transaction. Furthermore, this process is repeated in its entirety whenever the web browser client is directed to a different page on the retailer web site. Because the event log utilizes the unique identifier placed in the browser's local data store as part of a cookie, the event server system can recreate the entire purchase process even across separate visits across long periods of time (days, weeks, months) provided the cookie has not been deleted by the user.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computer-implemented method of capturing transaction data associated with a purchase made by a user on a client computer running a web browser client process and coupled over the Internet to an e-commerce server system, wherein the browser client process includes a script-generated process based on an e-commerce script served to the browser client process, the e-commerce script enabling e-commerce actions performed by the user including adding an item to a shopping cart and entering an execute purchase command that causes sending of a consummate-purchase command to the e-commerce server system, the method comprising:

serving to the browser client process a capture script, the capture script configured to perform processes of (i) attaching action listeners to monitor specified ones of the e-commerce actions and (ii) causing creation of an event log of the monitored e-commerce actions, wherein each such action listener is configured to write its corresponding action to the event log when such action has occurred, and (iii) causing sending of the event log to an event server system.

2. A method according to claim 1, wherein serving the capture script comprises:

serving to the browser client process the e-commerce script, wherein the e-commerce script is configured to perform processes (i), (ii), and (iii).

3. A method according to claim 2, the method further comprising:

serving by the e-commerce server system to the browser client process a starter script, which, on being downloaded by the browser client process, executes and causes the web browser client process to download and execute the e-commerce script.

4. A method according to claim 3, wherein the starter script causes the web browser client process to download the e-commerce script from a JavaScript server system that is distinct from the e-commerce server system and from the event server system.

5. A method according to claim 2, wherein the capture script checks for whether a cookie has been previously stored in local data storage associated with the web browser client process, wherein:

if not, then the e-commerce script generates a unique identifier for the browser client process, stores the unique identifier as a cookie in the local storage, and uses the unique identifier to tag the event log, or if so, the e-commerce script reads the unique identifier in the stored cookie and uses the unique identifier to tag the event log, in each case the unique identifier being stored by the event server system in association with the event log.

6. A method according to claim 1, wherein the capture script checks for whether a cookie has been previously stored in local data storage associated with the web browser client process, wherein:

if not, then the e-commerce script generates a unique identifier for the browser client process, stores the unique identifier as a cookie in the local storage, and uses the unique identifier to tag the event log, or if so, the e-commerce script reads the unique identifier in the stored cookie and uses the unique identifier to tag the event log, in each case the unique identifier being stored by the event server system in association with the event log.

\* \* \* \* \*